United States Patent [19]

Spalding

[11] Patent Number: 4,634,804
[45] Date of Patent: Jan. 6, 1987

[54] STREAMER CABLE WITH PROTECTIVE SHEATHS FOR CONDUCTOR BUNDLE

[75] Inventor: Philip C. Spalding, League City, Tex.

[73] Assignee: GECO Geophysical Company Incorporated, Houston, Tex.

[21] Appl. No.: 735,344

[22] Filed: May 17, 1985

[51] Int. Cl.$^4$ ............................................. H01B 7/04
[52] U.S. Cl. ................................... 174/24; 174/101.5; 174/136
[58] Field of Search ................... 174/24, 101.5, 70 R; 367/177, 20, 154

[56] References Cited

U.S. PATENT DOCUMENTS

| | | | |
|---|---|---|---|
| 3,155,768 | 11/1964 | Garshick | 174/101.5 |
| 4,078,223 | 3/1978 | Strange | 367/177 X |
| 4,296,481 | 10/1981 | Weiss | 174/101.5 X |
| 4,491,939 | 1/1985 | Carpenter | 174/101.5 X |

OTHER PUBLICATIONS

Berni, A. J. et al; Evaluation of a Solid Hydrophone Cable; IEEE Transactions on Sonics and Ultrasonics; vol. SU-29, No. 6; Jul. 1982; pp. 205-212.

*Primary Examiner*—Arthur T. Grimley
*Assistant Examiner*—Morris H. Nimmo
*Attorney, Agent, or Firm*—Dodge, Bush & Moseley

[57] ABSTRACT

In accordance with an illustrative embodiment of the present invention, a fish-net plastic sheath having oppositely layed, generally parallel plastic filaments is used to cover the conductor wire bundle at points where it could otherwise rub against the wire rope strain members of the cable. The filaments are joined at all crossing points to provide an expansible and contractible generally tubular construction that can be readily fitted over cable bundle during assembly. The sheaths prevent the wire rope strain cables in the streamer sections from rubbing directly against the conductor wires and causing holidays in the insulation and resulting shorts.

3 Claims, 4 Drawing Figures

STREAMER CABLE WITH PROTECTIVE SHEATHS FOR CONDUCTOR BUNDLE

FIELD OF THE INVENTION

This invention relates generally to marine streamer cables, and particularly to a new and improved streamer cable having a unique sheath means that affords protection to the conductor wire bundle that extends axially through cable sections.

BACKGROUND OF THE INVENTION

To conduct seismic exploration of water-covered areas of the earth, the usual practice is to tow a streamer cable through the water behind a vessel. The cable has a plurality of spaced-apart hydrophone detectors that sense the arrival of acoustic waves and provide electrical output signals that are indicative thereof. Periodic seismic disturbances are created in the water in the vicinity of the cable through operation of air guns, gas guns, sparkers, or even dynamite or the like, so that acoustic waves are created which travel downward through the earth. At subterranean levels where there are substantial changes in rock density, a portion of the wave is reflected back upward and is detected by the hydrophones. Electrical signals from the phones are transmitted via a bundle of conductor wires extending axially within the streamer cable to data processing and recording equipment onboard the vessel.

In modern seismic practices, streamer cables have become quite lengthy. It is not uncommon for a cable to be 2–3 miles long and comprise about 240–300 information channels. Each phone, or a discrete group of phones, is connected to onboard equipment using a pair of insulated conductor wires, so that it can be readily appreciated that a sizable bundle of such wires must be contained within the cable. A bundle that has in excess of 300 pairs of conductor wires is not unusual.

The towing load on each cable section typically is carried by three circumferentially spaced wire ropes that extend through spaced bulkheads and have their ends attached to connector fittings at the opposite ends of each section. The wire ropes are formed of twisted strands of wire that present rough and abrasive exterior surfaces. Inasmuch as the wire ropes extend alongside the conductor wire bundle, the ropes can rub against the conductor wires during handling and use, causing disruptions in the wire insulation and shorting. Of course when this happens, the conductor pair in which the shorted wire is located becomes inoperable and incapable of functioning to transmit signals from the phone or group of phones to which it is connected. That channel is dead.

The general object of the present invention is to provide a new and improved marine streamer cable section having sheaths that provide a protection for the conductor wire bundle against abrasion and damage caused by rubbing thereof against the wire rope strain members of the cable.

SUMMARY OF THE INVENTION

This and other objects of the present invention are attained through the provision, in a marine streamer cable having an oil-filled flexible tube, a plurality of spacers or bulkheads located at spaced points within the tube, a conductor wire bundle extending generally axially of the tube, and a plurality of wire rope strain members extending throughout the tube externally of the wire bundle, of radially expansible and contractible sheath members covering the wire bundle substantially throughout the length thereof between hydrophone locations. Each of the sheath members preferably has a "fishnet" construction of helically layed, parallel plastic filaments wound in opposite directions and joined together at all crossing points. The helical lay of the sheath member filaments allows expansion and contraction to various diameters to accommodate differing transverse dimensions of the conductor bundle, so that the sheath members can be easily positioned over the conductor bundle during assembly of the streamer cable section. The sheath members provide a plastic material armor that prevents the wire rope strain members from contacting the conductor wires, and thus protect their insulation covers from abrasion and tearing due to rubbing. In this manner, the incidences of conductor shorting is greatly reduced, providing cable sections of significantly improved reliability for seismic exploration activities.

BRIEF DESCRIPTION OF THE DRAWINGS

The present invention has other objects, features and advantages which will become more clearly apparent in connection with the following detailed description of a preferred embodiment, taken in conjunction the appended drawings, in which.

DETAILED DESCRIPTION OF A PREFERRED EMBODIMENT

Figure 1:
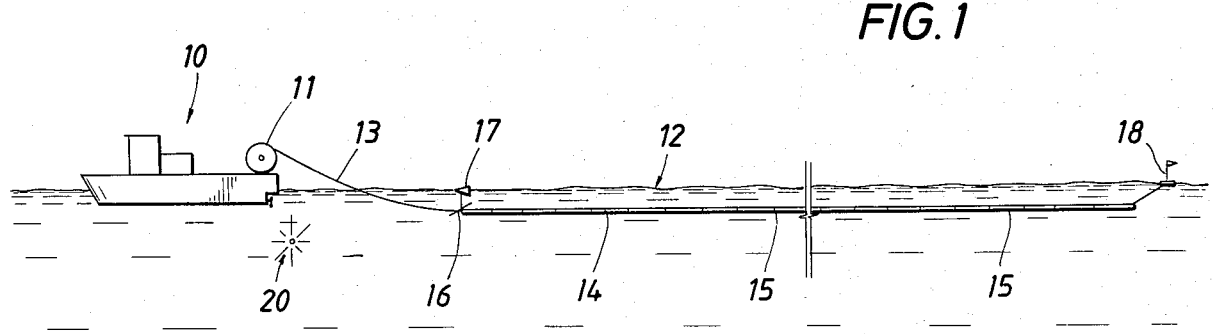
FIG. 1 is a schematic view of a marine streamer cable assembly being towed through the water behind a vessel.

Referring initially to FIG. 1, there is shown a seismic exploration boat 10 having a reel 11 at its stern for paying out a marine streamer cable assembly indicated generally at 12. The cable assembly 12 typically includes a lead-in section 13 having electrical conductors encased within plow steel armor wires to provide a towing member, one or more "stretch sections" of cable 14 to attenuate vibrations due to strumming of the lead-in cable 13 under tow, and a plurality of live sections 15 having hydrophones positioned at spaced points therein. A hydroplane or depressor 16 and a buoy 17 can be used to establish the towing depth of the front end of the cable assembly 12, and a tail buoy 18 can be used to determine the position of the rear of the cable assembly under tow. A plurality of devices commonly called "birds" (not shown) can be employed at various positions along the cable assembly to automatically control the depth of the cable below the water surface. As will be apparent to those skilled in the art, the proper depth is one that will enhance reception of acoustic waves and should, for example, be a distance equal to about one-quarter wave length of the seismic signal.

As the cable assembly 12 is towed at a constant speed, seismic disturbances indicated schematically at 20 are created in the water in a repetitive manner using known devices such as air guns, gas guns, sparkers, and the like, and the resulting acoustic waves travel downward through the water and into the earth. At levels where there is a density change in the rock strata which causes a significant impedance mismatch, a portion of the acoustic wave is reflected back upwardly toward the cable 12. Its arrival time, and strength, are detected by the phones. The output signals from the phones can be processed and recorded to provide a stratagraphic map of the subsurface layers in the earth. Of course, such maps are an invaluable aid to the exploration geophysicist or geologist in determining where pools of petroleum products might be trapped in the earth.

Figure 2:
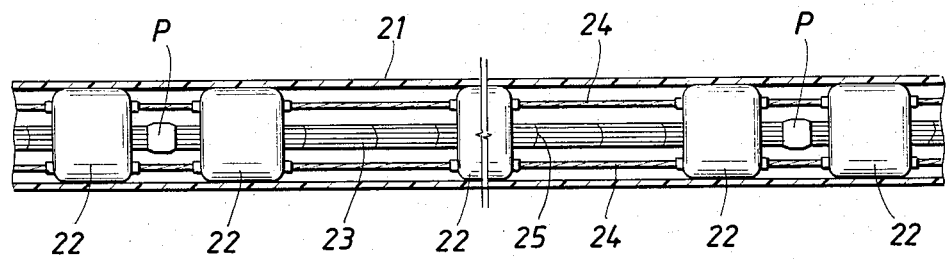
FIG. 2 is a fragmentary view of a prior art streamer cable section showing an arrangement of spacers, a conductor wire bundle, strain wires and an outer skin.

As shown in FIG. 2, each section of the cable 12 has an outer tubing 21 of polyvinyl chloride, polyethylene or the like, that houses spaced bulkheads 22, or spacers, through which a bundle of conductor wires 23 and three wire ropes 24 pass. The spacers 22 may be arranged at intervals along the cable in closely adjacent pairs (5-6 inches apart) so as to provide a "pocket" at which the hydrophone is mounted. The closely adjacent pairs of spacers may be separated by a substantial distance, for example about 3 feet, and additional spacers 22 provided at one foot intervals between such pairs of spacers. The bundle 23 of conductor wires includes a large number of insulated pairs of wires, and typically may be held together by lace cord 25 as shown. The wire ropes 24, which carry the towing strain, commonly are referred to as aircraft cable and have a diameter in the order of 5/32 inch. These ropes are formed of twisted wire strands and have a rough exterior. As will be readily apparent from FIG. 2, this construction is susceptible to having the wire ropes rub and abraid the conductors in the outer portion of the bundle 22 whenever the cable is subjected to bending, which can occur, for example, during winding of the cable assembly on the reel 11, as the boat 10 is turned to a new line of traverse, or during general handling of the cable assembly by the crew. In any event, rubbing of the strain cables 24 against the conductor wire bundle 23 can and does cause abrasion and tearing of the wire insulation, resulting in shorting and detector channel failure.

Figure 3:
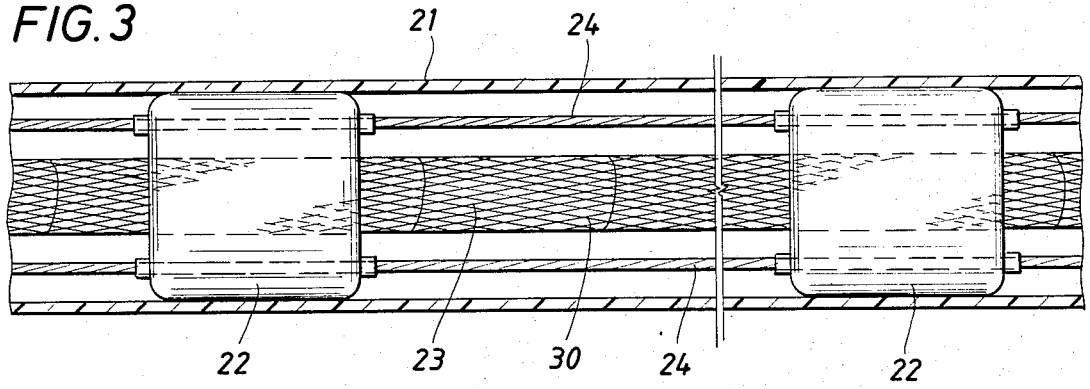
FIG. 3 is a view similar to FIG. 2 but incorporating protective sheaths in accordance with the present invention.
Figure 4:
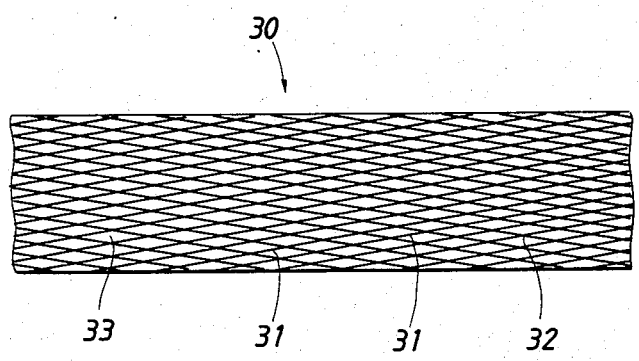
FIG. 4 is an enlarged fragmentary view of a sheath member in accordance with the present invention.

This problem is overcome through use on the present invention as shown in FIGS. 3 and 4. A protective sheath 30 is used to cover substantially the entire length of the bundle 23 that extends between the adjacent pairs of spacers 22 which provide phone "pockets" in order to prevent the strain cables 24 from rubbing against the conductor wires. The sheath-covered conductor bundle 23 extends through the central openings provided in the spacers which are located at one foot intervals. As shown in FIG. 4, each sheath section is comprised of a plurality of helically wound, parallel plastic filaments 31 of opposite lay and spaced circumferentially apart, with the filaments being joined at all crossing points 32. Thus constructed, the sheath section 30 has the capability to expand and contract to different diameters, so as to be easy to place on the bundle 23 and yet fit snugly around the laced conductor wires. The relatively close spacing of the plastic filaments 31 provides a "fish net" type of construction that prevents rubbing of the wire ropes 24 against the bundle 23, while providing substantial open areas between filaments to permit the passage of acoustic waves. Of course the void spaces within the tubing 21 are filed with a suitable cable oil, so that the assembled cable section is substantially neutrally buoyant in sea water.

OPERATION

In operation, the sheath sections 30 are positioned during cable assembly over the conductor wire bundle 23 so as to cover substantially the entire length that extends between the pairs of spacers 22 which form the phone pockets. The opposite-hand lay of the sheath fibers or filaments 32 allows expansion and contraction to different diameters so that the cable can be easily assembled. The sheaths sections 30 positively prevent the wire ropes 24 from rubbing against the conductor wires, to thereby prevent abrasion and tearing of their insulation during use and handling. The spaces or gaps 33 located between adjacent filaments 32 provides a sheath that is transparent to acoustic waves. The sheaths 30 are very easily positioned on the bundle 23 as the spacers 22 are positioned thereon during assembly on a work bench. The sheaths 20 are used in live sections, dead sections, and elastic sections.

It now will be recognized that a new and improved marine streamer cable construction that achieves the objectives of the present invention has been provided. The plastic sheaths provide a protection against rubber, wear and abrasion of the conductor wire insulation by the wire rope strain members, and greatly improves the reliability of the streamer cable sections in use.

Since certain changes or modifications may be made in the disclosed embodiment with departing from the inventive concepts involved, it is the aim of the appended claims to cover all such changes and modifications falling within the true spirit and scope of the present invention.

What is claimed is:

1. In a marine streamer cable having a bundle of conductor wires and a plurality of wire rope strain members enclosed in an oil-filled flexible tubing having spacers positioned along its length, the improvement comprising a plurality of protective sheath members surrounding said conductor wire bundle and covering said bundle throughout substantially the entire length thereof, each of said sheath members having generally parallel, spaced-apart fibers extending in opposite helical directions to enable expansion and contraction of said members to different diameters during assembly, said sheath members positively preventing rubbing of said wire rope strain members against said conductor wires and consequent abrasion and tearing of the insulation of said wires.

2. The apparatus of claim 1 wherein said fibers are made of said plastic material, and are joined together at each crossing point of said fibers.

3. The apparatus of claim 2 wherein the helical lay angle of said fibers is sufficient to allow diametrical expansion of said sheath to a diameter that is approximately twice its relaxed diameter.

* * * * *